(12) United States Patent
Sefler

(10) Patent No.: US 8,750,720 B2
(45) Date of Patent: Jun. 10, 2014

(54) PHOTONIC IMPULSE GENERATOR

(75) Inventor: George A. Sefler, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 405 days.

(21) Appl. No.: 13/037,814

(22) Filed: Mar. 1, 2011

(65) Prior Publication Data

US 2012/0224859 A1 Sep. 6, 2012

(51) Int. Cl.
*H04B 10/04* (2006.01)

(52) U.S. Cl.
USPC .......................... 398/183; 398/190; 398/193

(58) Field of Classification Search
USPC ............. 398/97–99, 149–152, 175–180, 183, 398/190, 193
See application file for complete search history.

(56) References Cited

U.S. PATENT DOCUMENTS

| | | | | |
|---|---|---|---|---|
| 5,822,103 | A * | 10/1998 | Boroson | 398/189 |
| 7,151,897 | B2 * | 12/2006 | Ohara et al. | 398/155 |
| 2004/0264977 | A1 * | 12/2004 | Yap et al. | 398/161 |
| 2005/0175357 | A1 * | 8/2005 | Kawanishi et al. | 398/187 |
| 2009/0097520 | A1 * | 4/2009 | Harter | 372/44.01 |
| 2010/0183303 | A1 * | 7/2010 | Okabe et al. | 398/52 |
| 2011/0228255 | A1 * | 9/2011 | Li et al. | 356/33 |

OTHER PUBLICATIONS

S. Lee, D. Mandridis, and P.J. Delfyett, "33MHz repetition rate semiconductor mode-locked laser using eXtreme chirped pulse oscillator," in Proc. Conf. Lasers Electro-Opt., 2008, pp. 1-2.
S. Lee, K. Kim, and P.J. Delfyett, "Extreme chirped pulse oscillator (XCPO) using a theta cavity design," IEEE Photon. Technol. Lett., vol. 18, No. 7, pp. 799-801, Apr. 2006.
A. Zeitouny, S. Stepanov, O. Levinson, and M. Horowitz, "Optical generation of linearly chirped microwave pulses using fiber Bragg gratings," IEEE Photon. Technol. Lett., vol. 17, No. 3, pp. 660-662, Mar. 2005.
M. Bolea, J. Mora, B. Ortega, and J. Capmany, "Optical UWB pulse generator using an N tap microwave photonic filter and phase inversion adaptable to different pulse modulation formats," Opt. Express, vol. 17, No. 7, pp. 5023-5032, Mar. 2009.
I.S. Lin, J.D. McKinney, and A.M. Weiner, "Photonic synthesis of broadband microwave arbitrary waveforms applicable to ultra-wideband communication," IEEE Microw. Wireless Compon. Lett., vol. 15, No. 4, pp. 226-228, Apr. 2005.

(Continued)

*Primary Examiner* — Dzung Tran
(74) *Attorney, Agent, or Firm* — K&L Gates LLP

(57) ABSTRACT

Various embodiments are directed to a photonic impulse generator comprising a periodically chirped photonic source a single-frequency photonic source, a photodetector, an optical coupler, and a filter. The optical coupler may be positioned to couple an output of the single-frequency photonic source to an output of the periodically chirped photonic source, resulting in a combined photonic signal. The photodetector may be positioned to receive the combined photonic signal and generate a combined electrical signal. The filter may be in electrical communication with an output of the photodetector to receive the combined electrical signal.

23 Claims, 9 Drawing Sheets

(56) References Cited

OTHER PUBLICATIONS

Q. Wang, F. Zeng, S. Blais, and J. Yao, "Optical ultrawideband monocycle pulse generation based on cross-gain modulation in a semiconductor optical amplifier," Opt. Lett., vol. 31, No. 21, pp. 3083-3085, Nov. 2006.

J. Yao, F. Zeng, and Q. Wang, "Photonic generation of ultrawideband signals," J. Lightw. Technol., vol. 25, No. 11, pp. 3219-3235, Nov. 2007.

F. Zeng and J. Yao, "Ultrawideband impulse radio signal generation using a high-speed electrooptic phase modulator and a fiber-Bragg-grating-based frequency discriminator," IEEE Photon. Technol. Lett., vol. 18, No. 19, pp. 2062-2064, Oct. 2006.

F. Zeng and J. Yao, "An approach to ultrawideband pulse generation and distribution over optical fiber," IEEE Photon. Technol. Lett., vol. 18, No. 7, pp. 823-825, Apr. 2006.

\* cited by examiner

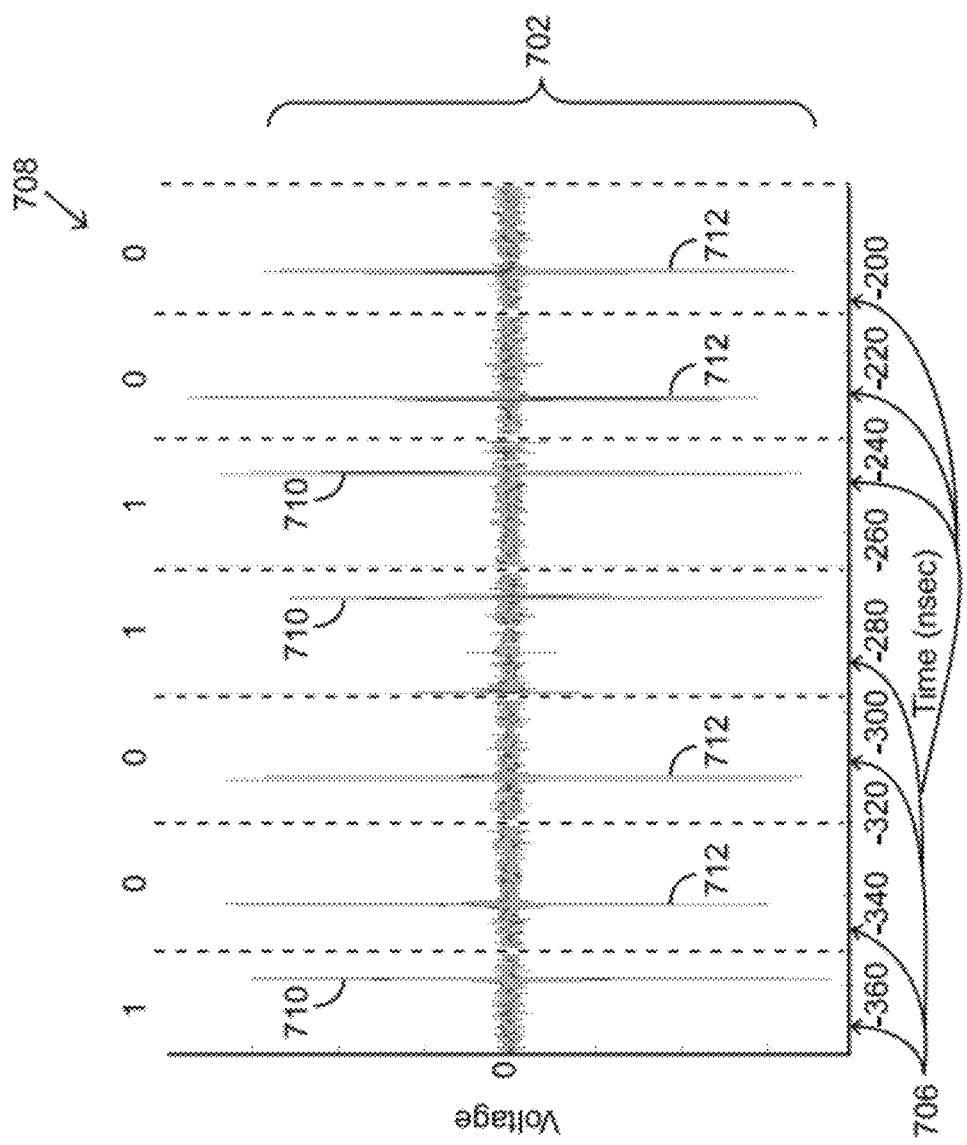

PHOTONIC IMPULSE GENERATOR

BACKGROUND

In recent years, there has been renewed emphasis on impulse radio applications, including those related to Ultra-wideband transmissions. Ultra-wideband (UWB) is an emerging technology for short-range, high-speed wireless communications and other RF transmissions. In 2002, the Federal Communications Commission (FCC) authorized the unlicensed use of UWB devices on the spectrum between 3.1 GHz and 10.6 GHz. To be FCC-compliant, a UWB signal must have a bandwidth greater than 500 MHz, or a fractional bandwidth greater than 20%, and meet an FCC-specified power spectral mask.

Several photonic techniques are known for generating UWB signals. According to these photonic techniques, some or all of the signal generation process is performed on an optical or photonic signal. The photonic signal is ultimately converted to a radio frequency signal suitable for wireless transmission. This conversion is often performed with a photodetector, which is often located remotely via an optical fiber. The typical impulse is a Gaussian-monocycle or Gaussian-doublet pulse waveform. Many of the known photonic techniques suffer from disadvantages of complexity, size, and/or impulse distortion. Complexity results from the use of high-speed electronic and photonic components operating at the multi-GHz bandwidth of the impulses.

One type of known photonic UWB impulse method converts a phase-modulated optical signal to an intensity-modulated optical signal. According to this method, a high speed electronic pulse generator generates an electrical Gaussian pulse. This electrical pulse is provided to a high-speed optical phase modulator, which outputs a Gaussian-pulse phase modulated optical signal. An optical frequency discriminator receives the phase modulated optical signal and converts it to a Gaussian-monocycle or Gaussian-doublet intensity modulated optical pulse and also shifts the modulation power spectrum to the FCC UWB passband. The frequency discriminator is either an optical bandpass filter or a dispersive device such as a dispersive fiber or a chirped Bragg grating. Prior to wireless transmission, this optical pulse is converted to an electrical pulse using a photodetector.

The phase-modulation to intensity-modulation method described above suffers from several disadvantages. First, the high-speed electronic pulse generator and optical phase modulator, along with an additional optical modulator needed in most cases to encode data onto the impulses, add complexity and expense to the overall system. Additionally, implementing the common pulse position modulation (PPM) technique with a phase modulation to intensity-modulation system is non-trivial. For example, the PPM signal is often generated by a high-speed pulse selector (either electrical or optical) that selects from multiple impulses generated, either electrically or optically, at the PPM slot rate. The power, complexity and speed requirements of the system increase in proportion to the PPM order. Further, the system is sensitive to fiber transmission distortions (i.e., in applications where the photodetector is remote from other components of the system and connected by a length of optical fiber). Fiber propagation of the narrow pulses can result in waveform distortions due to fiber dispersion. Temperature variations and/or mechanical vibrations in the fiber transmission line produce phase and polarization fluctuations of the transmitted light, which can appear as noise and distortion after photodetection. Also, set-ups that utilize a dispersive device are sensitive to the length of any fiber used to distribute the signal. If that fiber length is changed, the frequency response of the system also changes, causing distortion to the UWB impulses.

Another known UWB impulse technique utilizes photonic microwave delay-line filters. According to this technique, a high-speed electronic pulse generator is similarly used to generate a Gaussian electrical pulse that, in turn, drives a high-speed optical intensity modulator. A multi-tap photonic microwave delay-line filter converts the Gaussian-pulse modulation into either Gaussian-monocycle or Gaussian-doublet modulation. These techniques, also, suffer from several disadvantages. High-speed electronic pulse generators and optical modulators are still required. Also, to realize a photonic delay-line filter with the necessary negative tap, special designs are required (e.g., cross-gain modulation in a semiconductor optical amplifier, cross-polarization modulation, or phase inversion in a Mach-Zehnder modulator). Further, the technique is susceptible to many of the fiber-transmission distortions and data modulation difficulties described above.

An additional UWB impulse technique is based on optical pulse shaping. According to this technique, the spectrum of a pulsed laser is sculpted with an optical spectral shaper to resemble a desired temporal pulse profile. Wavelength-to-time mapping by a dispersive device (e.g., a dispersive fiber or chirped Bragg grating) translates the shaped spectrum into time. The width of the impulses equals the product of the optical bandwidth and the dispersion of the dispersive device. One common type of spectral shaper uses a diffraction grating to project the laser spectrum upon a spatial light modulator (SLM), which then tailors the spectrum. Again, this method suffers from several disadvantages. For example, many of the disadvantages regarding data modulation and fiber-transmission distortions described above apply equally to optical pulse shaping techniques. Further, free-space implementation of the optical spectral shaper makes optical pulse shaping systems bulky and complicated.

SUMMARY

Various embodiments described in the present disclosure are directed to photonic impulse generators, systems comprising photonic impulse generators, and methods of using and/or operating photonic impulse generators. An example photonic impulse generator may comprise a periodically chirped photonic source (e.g., a chirped, pulsed laser) and one or more single-frequency photonic sources (e.g., constant wavelength or single-frequency lasers). Outputs of the periodically chirped and single-frequency photonic sources may be coupled at an optical coupler. A photonic output of the optical coupler may be directed to a photodetector, which may generate an electrical signal corresponding to the received photonic signal. The electrical signal may be filtered by a bandpass filter to generate an output signal comprising at least one impulse.

FIGURES

Various embodiments of the present invention are described here by way of example in conjunction with the following figures, wherein:

FIG. 7 illustrates a graph showing a binary pulse position modulation (PPM) modulated electrical heterodyne signal and a binary PPM modulated impulse signal generated by one embodiment of the impulse generator of FIG. 1.

DESCRIPTION

Figure 1:
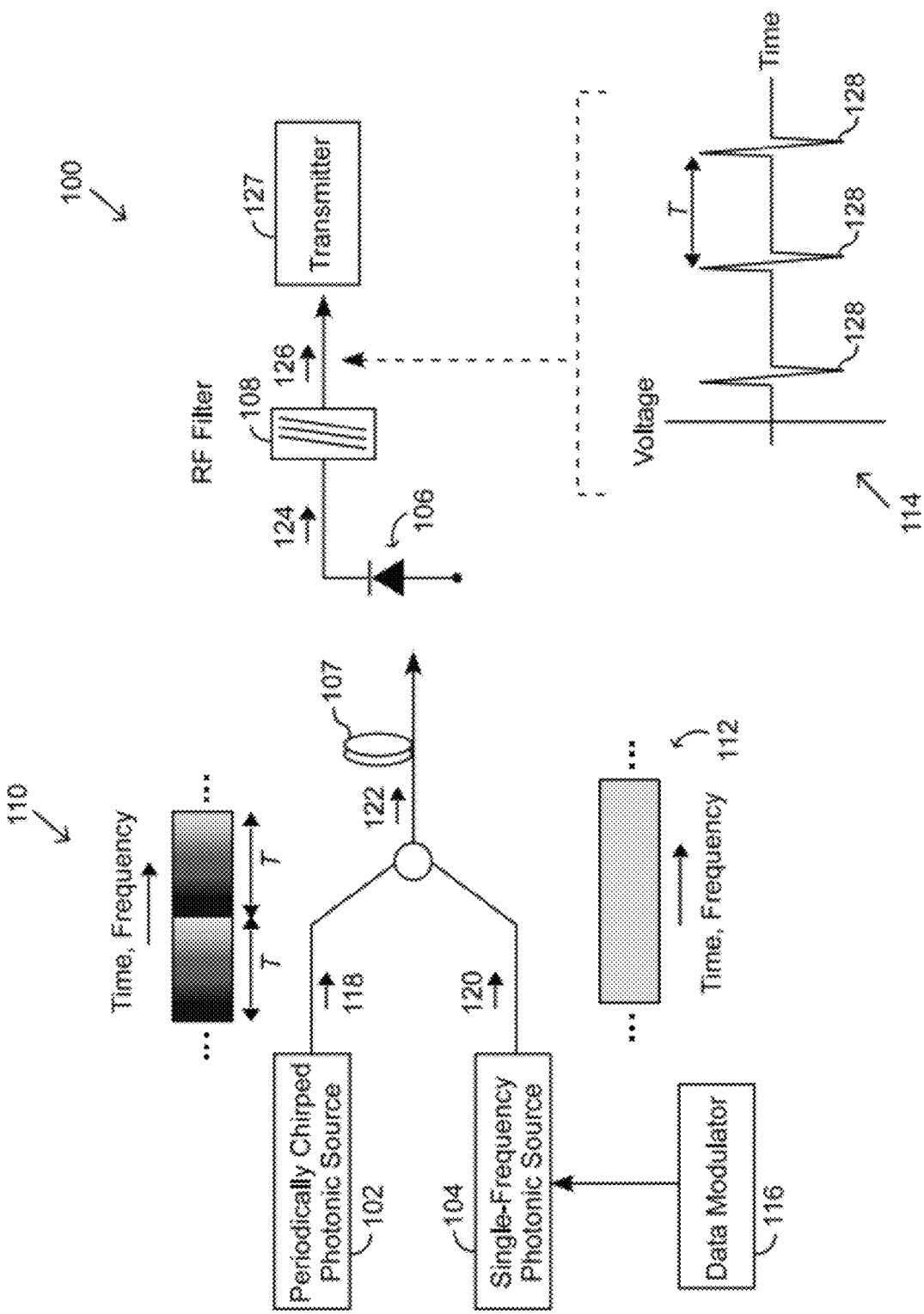
FIG. 1 illustrates one embodiment of a photonic impulse generator.

FIG. 1 illustrates one embodiment of a photonic impulse generator 100. The generator 100 may comprise a periodically chirped photonic source 102, a continuous wave (CW) or single-frequency photonic source 104, an optical coupler 105, a photodetector 106 and an electronic filter 108. The periodically chirped source 102 may provide a photonic chirped output 118 with an optical frequency or wavelength that varies periodically over a given range. Chart 110 is an illustration of the optical frequency of the chirped output 118 showing the frequency of the output 118 sweeping across a range of wavelengths. The period of the chirp or sweep is indicated by "T." Different frequencies are indicated by different degrees of shading. The chirp rate (e.g., the frequency range divided by T) may vary from application to application and may affect the profile of the resulting impulses, as described herein. Also, it will be appreciated that the chirp rate of the chirped output 118 may be substantially constant throughout the period T, or, in some embodiments, may vary. The single-frequency source 104, on the other hand, may have an output 120 having a constant optical frequency or wavelength. The single frequency of the single-frequency source 104 may fall within the range of frequencies swept by the periodically chirped source 102. Chart 112 is an illustration of the frequency output of the single-frequency source, representing a constant, single frequency.

The outputs 118, 120 may be received by an optical coupler 105, which may combine the outputs 118, 120 to generate a combined or chirped heterodyne photonic signal 122. For example, the sources 102, 104 may be configured to allow interference between their respective outputs, 118, 120. The optical coupler 105 may be any suitable type of optical or other photonic coupler that does not impede the interference of coupled signals. For example, the coupler 105 may be a 3 dB fiber coupler. In some embodiments, the sources 102, 104 may be implemented utilizing lasers or other sources having a coherent output. Also, for example, the polarization of the outputs 118, 120 may be substantially the same and may be, but need not be maintained throughout the optical portion of the system, for example, as described herein below. It will be appreciated that the instantaneous frequency of the periodically chirped source 102 and the frequency of the single-frequency source 104 will be substantially equal at least once per period T of the periodically chirped source.

The heterodyne photonic signal 122 may be provided to the photodetector 106 (e.g., the signal 122 may be incident on the photodetector 106). In response, the photodetector 106 may generate a corresponding heterodyne electrical signal 124. The photodetector 106 may be any suitable type of detector capable of receiving a photonic and/or optical signal and converting it into an electrical signal. For example, in some embodiments, the photodetector 106 may comprise a photodiode. Also, in various embodiments, the sensitivity spectrum of the photodetector may be selected to include the range of wavelengths output by the periodically chirped source 102. In some embodiments, the photodetector 106 may be remotely located from the photonic sources 102, 104 and coupler 105 by an optional length of optical fiber 107. Also, it will be appreciated that, in some embodiments, the photodetector 106 may have a low-pass effect on the signal 122, resulting in a heterodyne electrical signal 124 with different frequency characteristics than the heterodyne photonic signal 122.

The chirped heterodyne electrical signal 124 may be provided to a filter 108, resulting in an impulse signal 126. In various embodiments, the impulse signal 126 may, in turn be transmitted utilizing a transmitter 127 (e.g., a radio-frequency transmitter). The impulse signal may comprise impulses formed whenever the instantaneous frequency of the heterodyne signal 124 coincides with the filter frequency characteristic. For example, the impulse signal 126 may comprise one impulse per period of the periodically chirped photonic source 102. The filter 108 may be an RF passband filter configured to confine the impulse signal 126 to a desired frequency band including, for example, the FCC UWB band described herein. The filter 108 may be implemented in any suitable manner. For example, in some embodiments, the filter 108 may be implemented as an analog filter utilizing analog components such as, for example, one or more resistors, one or more capacitors, one or more inductors, etc. In some embodiments, the photodetector 106 may provide an intrinsic low-pass filtering of the signal 122 resulting in baseband impulses, thus obviating the need for further filtering by a separate filter, such as 108.

Chart 114 illustrates the amplitude of the impulse signal 126 versus time. As illustrated, the impulse signal 126 comprises a plurality of impulses 128. One impulse may occur per period T of the periodically chirped source 102. The impulses 128 may occur, in time, when the frequency of the periodically chirped source 102 substantially coincides with the frequency of the single-frequency source 104. The profile of the impulses 128 may be determined, at least in part, by the chirp rate of the periodically chirped source (e.g., the frequency range of the chirped source divided by T) and by characteristics of the filter 108 (or the filtering properties of the photodetector 106). As illustrated in FIG. 1, all of the impulses are separated in time by the length of the period T. In some embodiments, however, the distance in time between consecutive impulses may be greater than or less than the length of the period T. For example, when a data signal is encoded on the impulse signal 126 (e.g., utilizing data modulator 116, as described herein), the distance in time between successive impulses 128 may not be constant.

Figure 2:
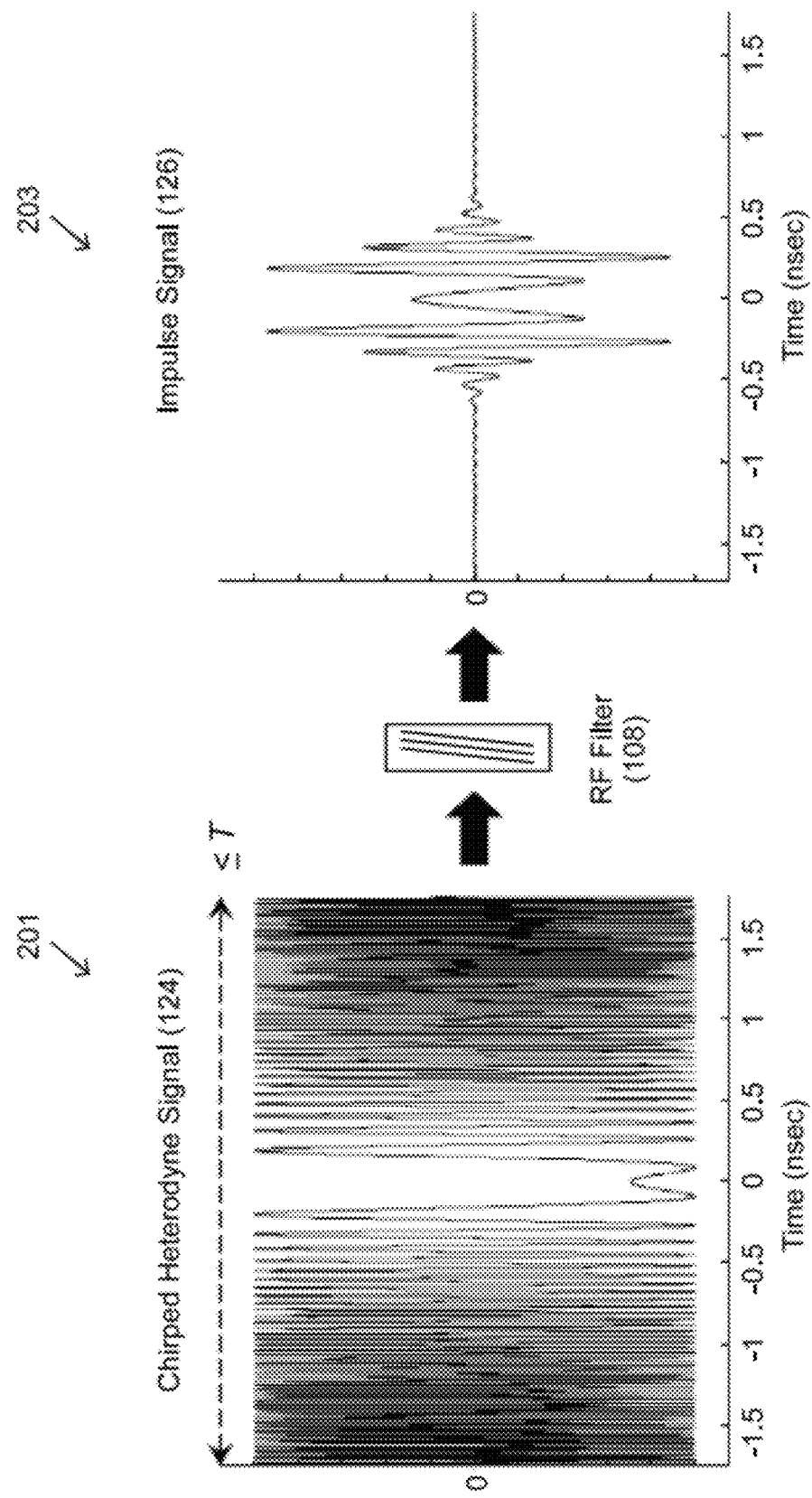
FIG. 2 illustrates a graph showing voltage versus time for various signals generated by and in one embodiment of the impulse generator of FIG. 1.
Figure 3:
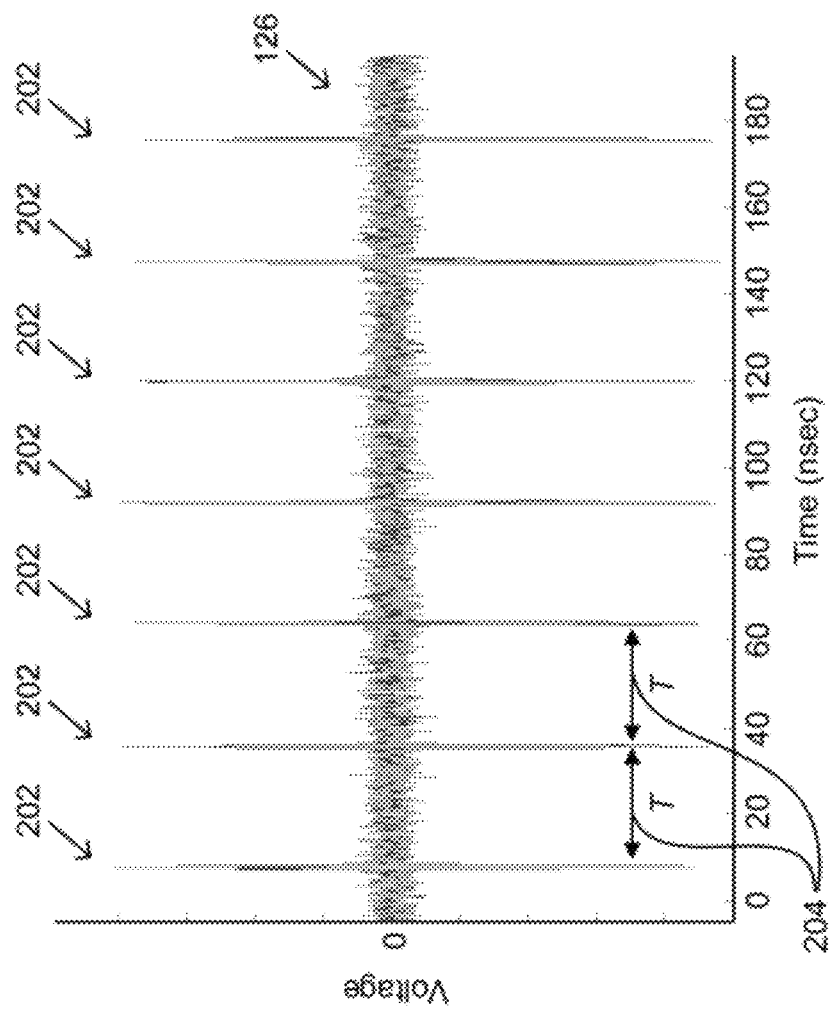
FIG. 3 illustrates a graph showing voltage versus time for the impulse signal generated by one embodiment of the impulse generator of FIG. 1 showing multiple impulses.

FIG. 2 illustrates a pair of graphs 201 and 203 showing the chirped electrical heterodyne signal 124 (graph 201) and impulse signal 126 (graph 203) versus time within a single period T for a signal generated by and in one embodiment of the impulse generator 100. As described herein, the impulse signal 126 may be derived from the heterodyne signal 124, for example, after bandpass filtering by the filter 108. The impulse signal 126 shows a single impulse 202 centered at the zero position on the time axis, corresponding to a frequency of zero within the chirped heterodyne signal 124, or when the optical frequencies of the photonic sources 102 and 104 coincide. It will be appreciated that FIG. 2 shows just one impulse 202 and that the profile of each impulse 202 on the impulse signal 126 may vary with both the frequency response or passband of the filter 108 and the relative phase of the photonic sources 102 and 104. Impulses in the impulse signal 126 may occur periodically, as described herein. For example, FIG. 3 illustrates a graph 300 showing voltage versus time for the impulse signal 126 generated by one embodiment of the impulse generator 100 showing multiple impulses 202. As illustrated in FIG. 3, the distance in time between successive pulses 204 may be equal to the period length T.

Figure 3A:
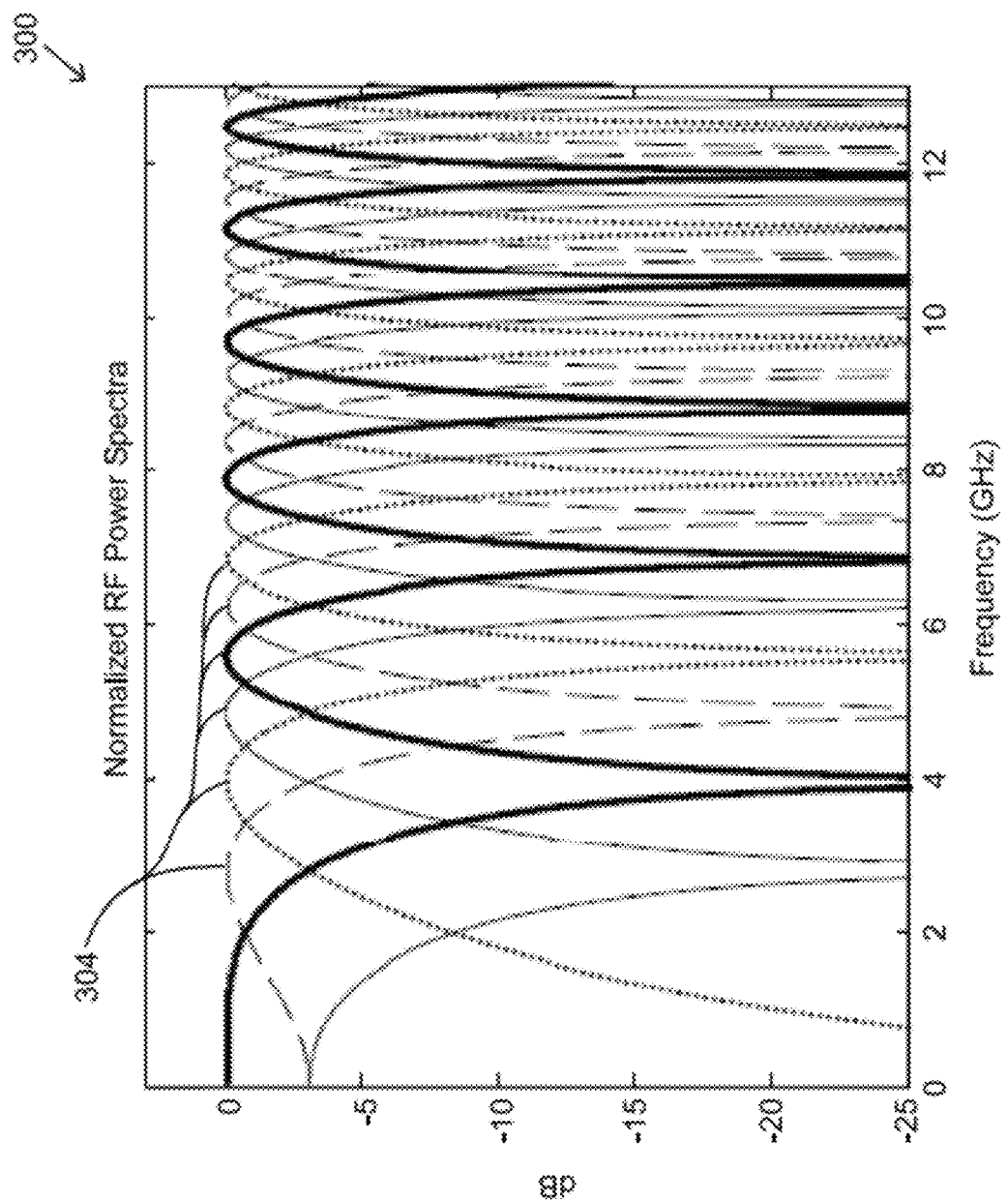
FIG. 3A illustrates a graph showing normalized power spectra for several chirped heterodyne signals generated by one embodiment of the impulse generator of FIG. 1.

FIG. 3A illustrates a graph 300 showing normalized power spectra 304 for several chirped heterodyne signals 124 (e.g., at the output of the photodetector 106) generated by one embodiment of the impulse generator 100. Each spectrum 304 corresponds to a different relative phase between the chirped source 102 and the single-frequency source 104. In various embodiments, the phase of the single-frequency source 104 may be permitted to change randomly in time (e.g., through active coherence control or in accordance with the source's natural coherence time). In this way, the time-averaged power of the chirped heterodyne signal 124 may be uniform as a function of frequency. Accordingly, the spectrum of the impulse signal 126 may be defined completely by the electronic filter transmission (e.g., filter 108) and fiber propagation of the coupled photonic sources may not distort the impulse signal spectrum. According to various embodiments, a phase-insensitive envelope receiver may be used for receiving a wirelessly transmitted impulse signal having a randomly variable phase, as described herein.

Figure 4:
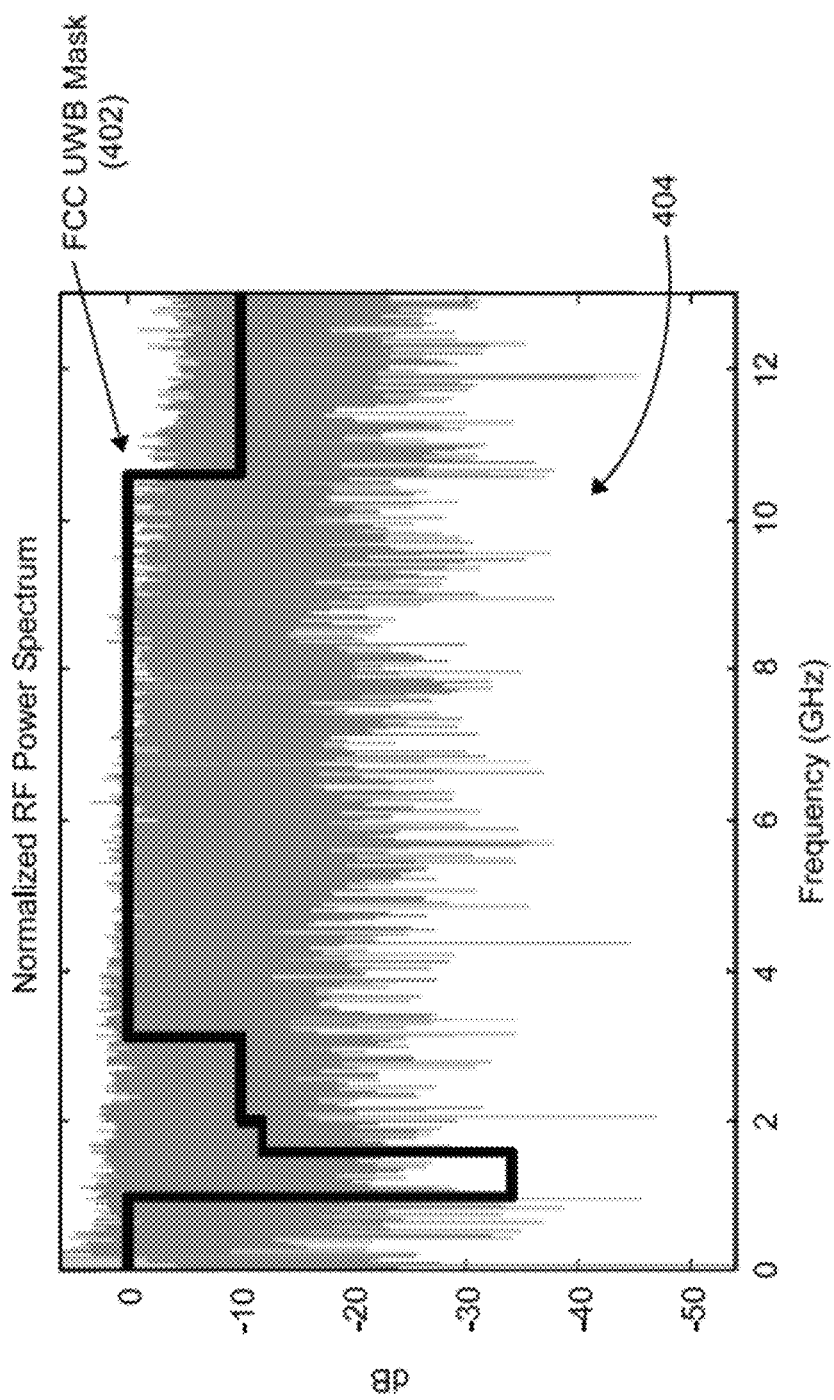
FIG. 4 illustrates a graph showing a normalized time-averaged power spectrum of an electrical heterodyne signal generated by one embodiment of the impulse generator of FIG. 1.

FIG. 4 illustrates a graph 400 showing a normalized time-averaged power spectrum 404 of the electrical heterodyne signal 124 generated by one embodiment of the impulse generator 100 (e.g., at the output of the photodetector 106). In the result illustrated in the graph 400, the phase of the single-frequency photonic source 104 has been permitted to change randomly according to the source's coherence time. FIG. 4 also shows the normalized FCC UWB spectral mask 402. The mask 402, as illustrated, represents a bandwidth primarily between 3.1 GHz and 10.6 GHz. As shown, the power spectrum 404 of the signal 124 extends, and is relatively constant, across the FCC UWB spectral mask 402. Accordingly, the impulse signal 126, when filtered to fit the spectral mask 402, may exhibit a relatively constant power spectrum (e.g., maximum power) across the FCC UWB spectrum 402.

Figure 4A:
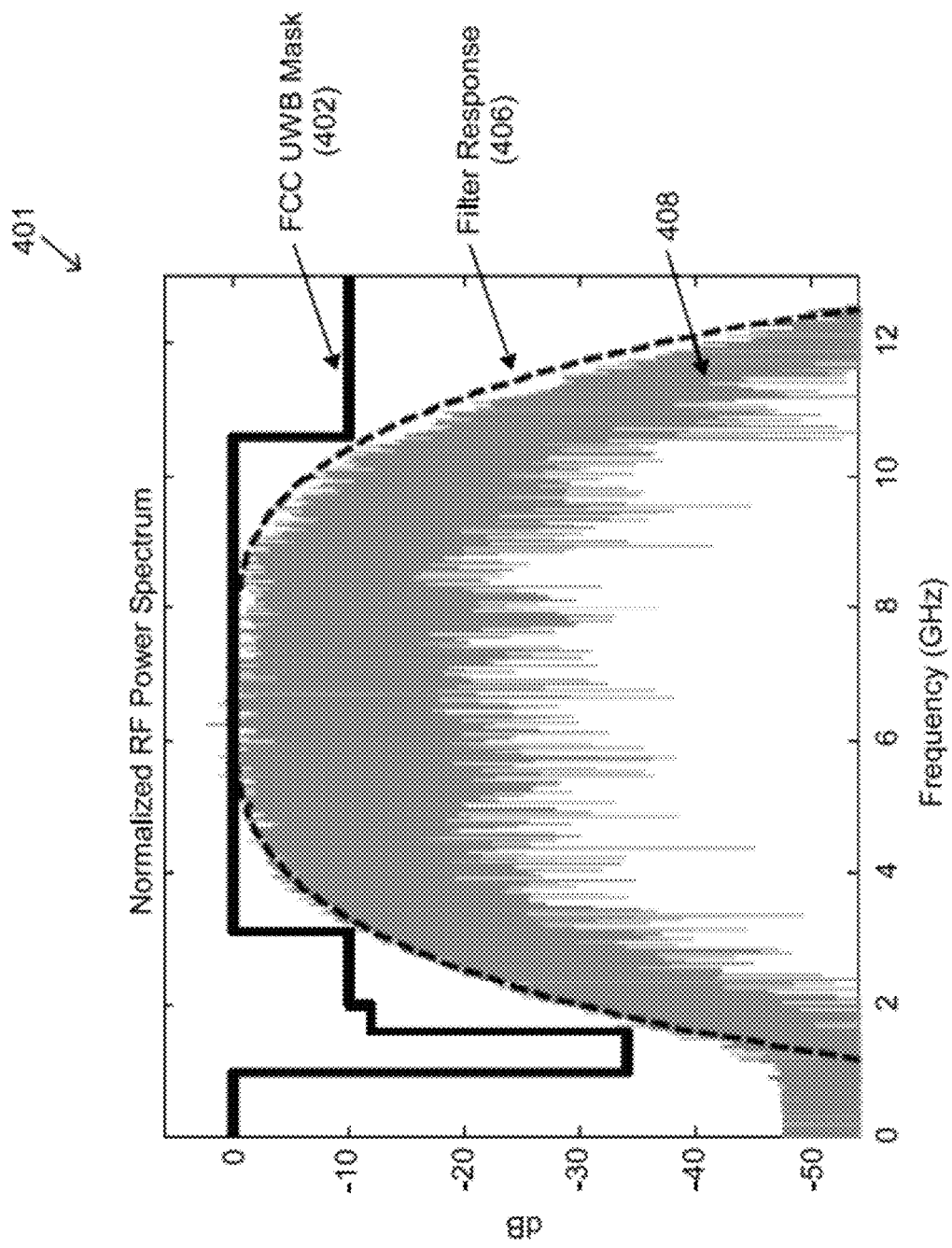
FIG. 4A illustrates a graph showing the normalized power spectrum of an impulse signal produced according to various embodiments of the impulse generator of FIG. 1 so as to comply with the FCC UWB mask.

FIG. 4A illustrates a graph 401 showing the normalized power spectrum 408 of an impulse signal 126 produced according to various embodiments of the filter 108 having the filter response 406, so as to comply with the FCC UWB mask 402. Also shown is an example response 406 of various embodiments of the filter 108. It can be seen from FIG. 4A that the impulse signal spectrum 408 falls within the FCC UWB spectral mask 402 and makes efficient use of the allocated spectrum. It will be appreciated that, in various embodiments, the impulse signal 126 may make more efficient use of the FCC UWB spectrum by utilizing different filters 108 (e.g., having different filter responses 406).

Figure 5:
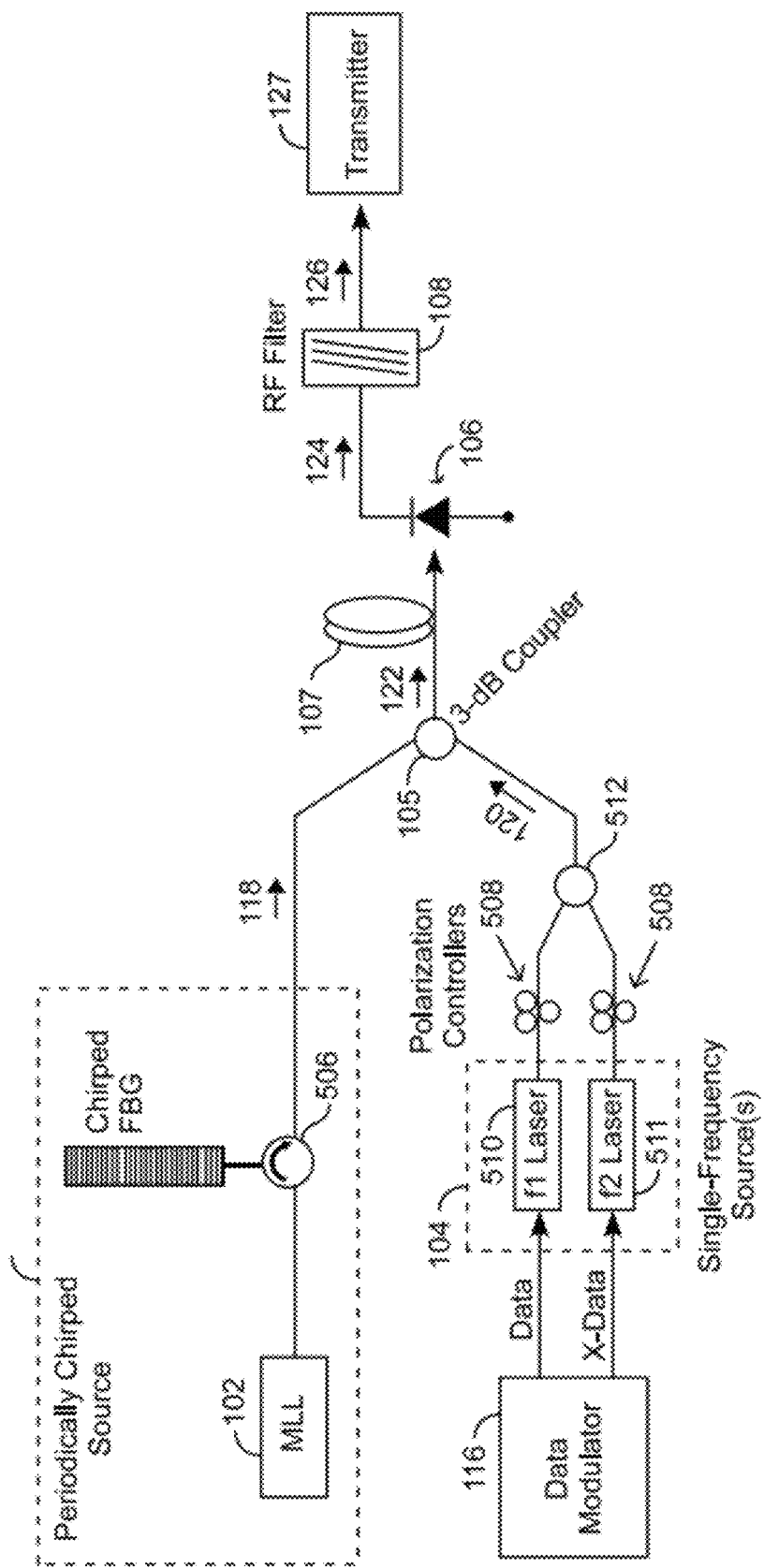
FIG. 5 illustrates one embodiment of the impulse generator showing additional details of several components thereof.

FIG. 5 illustrates one embodiment of the impulse generator 100 showing additional details of several components thereof. For example, the periodically chirped source 102 may include a mode-locked-laser (MLL) 504 and a chromatic dispersive element, such as a chirped fiber Bragg grating 506. The MLL 504 may provide pulses of any suitable pulse width.

In some embodiments, the MLL 504 may be a femtosecond MLL, providing pulses with temporal widths on the order of a femtosecond (e.g., $10^{-15}$ of a second), a few hundreds of femtoseconds, etc. The pulses of the MLL 504 may interact with the chirped fiber Bragg grating 506 to provide the periodically chirped photonic output 118. The optical frequency range and period T of the output 118 may be determined, at least in part, by the pulse width of the MLL 504, the center wavelength of the MLL 504, and the spatial position of the index-of-refraction variations in the chirped fiber Bragg grating 506. In some embodiments, the periodically chirped source 102 may comprise a theta-cavity laser in addition to or instead of the components illustrated in FIG. 5.

In the example embodiment shown in FIG. 5, the single-frequency source 104 comprises a plurality of alternative single-frequency sources 510, 511 that, in some embodiments, may be distributed feedback (DFB) lasers. The respective outputs of the single-frequency sources 510, 511 may be joined at optical coupler 512. The optical coupler 512 may be any suitable form of optical coupler including, for example, a standard 3 dB fiber coupler and/or a wavelength division multiplexing (WDM) coupler. Also, in some embodiments, the outputs of the respective single-frequency sources 510, 511 may be passed through one or more polarization controllers 508 to ensure that the polarization of their respective outputs (e.g., signal 120) has a polarization substantially equivalent to that of the periodically chirped source 102. In various embodiments, the polarization controllers 508 may be omitted. For example, optical transmission media used to transport the signals 118, 120 may be made from polarization maintaining components such as, for example, polarization maintaining optical fibers or other polarization maintaining transmission media.

According to various embodiments, the impulse generator 100, as illustrated in FIGS. 1 and 5, may be utilized to transmit data signals. For example, the impulse signal 126 may be encoded with a data stream, by a data modulator 116, as described herein. The encoded impulse signal 126 may be transmitted utilizing a transmitter 127 (e.g., a radio-frequency transmitter). Any suitable method may be used to encode the data stream onto the impulse signal 126. For example, the data modulator 116 may comprise, for example, analog and/or digital circuitry, and or a microprocessor for encoding a data stream, ultimately onto the impulse signal 126. Any suitable modulation format may be used. For example, in some embodiments, the data modulator 116 may encode a data signal onto the impulse signal 126, at least in part, by manipulating the operation (e.g., amplitude, phase, frequency, polarization, etc.) of one or more components of the single-frequency source 104 (e.g., sources 510, 511). In various embodiments, modulation of the single-frequency source 104 may be synchronized with the period T of the periodically chirped source 102. According to various embodiments, the data modulator 116 may receive a synchronization or clock signal 516 from the periodically chirped source 102. The sync signal 516 may allow the data modulator 116 to synchronize the modulation of the single-frequency source 104 to correspond with the period T of the source 102. In some embodiments, the data modulator 116 alternatively may manipulate the operation (e.g., amplitude, phase, polarization, etc.) of the periodically chirped source 102 for purposes of encoding a data stream on the impulse signal 126.

The data modulator 116 may encode a data stream onto the impulse signal 126 according to any suitable data modulation format. For example, according to various embodiments, the data modulator 116 may modulate the data stream onto the impulse signal according to an on-off keyed (OOK) format.

According to one example of an OOK modulation format, the data modulator 116 may cycle the single-frequency source 104 on and off in a manner corresponding to the data stream. When the single-frequency source 104 is off, no impulse may be formed within the impulse signal 126 (e.g., because there is no impulse-generating interference). Accordingly, the presence or absence of impulses within the impulse signal 126 may represent logical ones and zeros in any suitable manner. It will be appreciated that some embodiments of the impulse generator for utilizing OOK modulation need only contain one single-frequency source (e.g., one of sources 510, 511).

Figure 6:
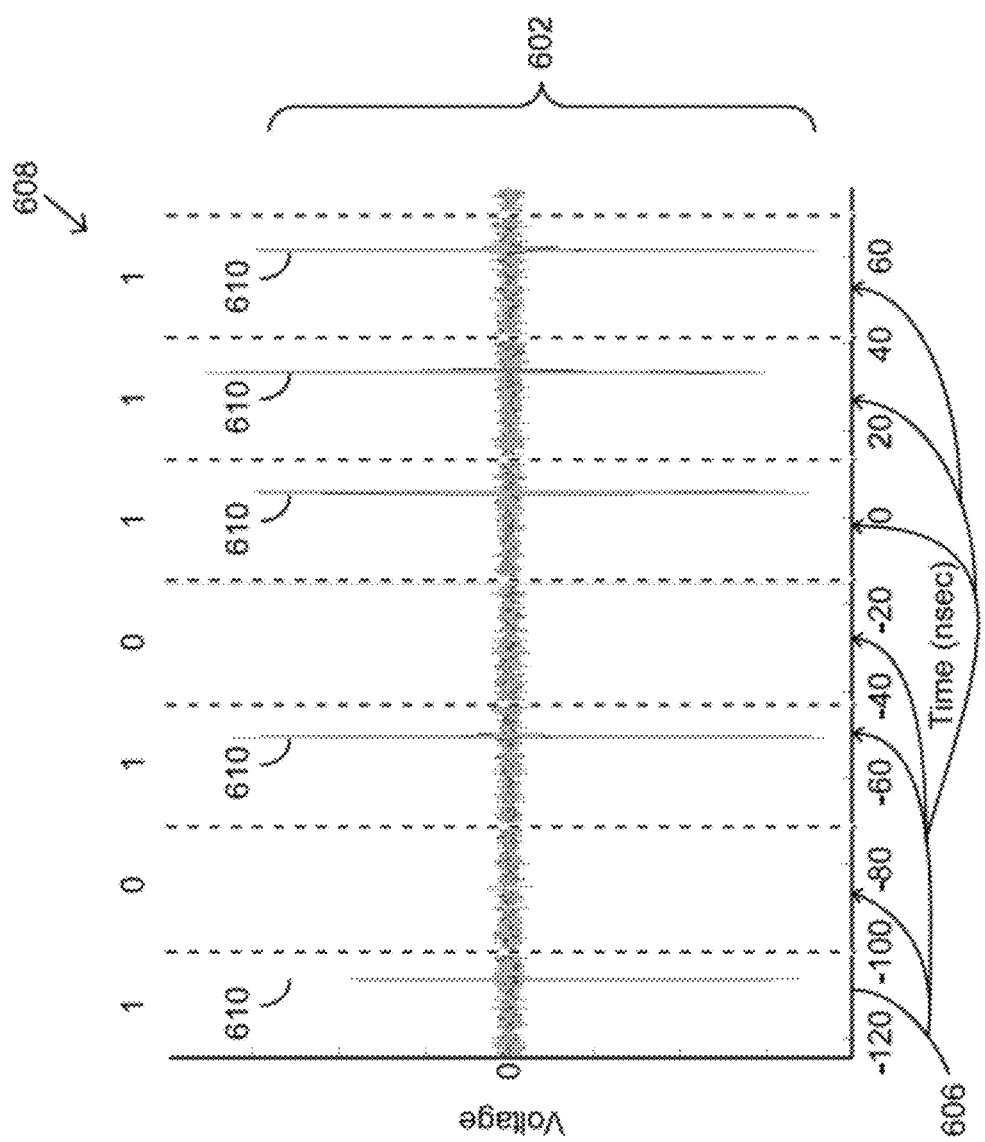
FIG. 6 illustrates a graph showing an on-off keyed (OOK) modulated impulse signal generated by one embodiment of the impulse generator of FIG. 1.

FIG. 6 illustrates a graph 600 showing an OOK modulated impulse signal 602 generated by one embodiment of the impulse generator 100. The graph 600 shows voltage versus time for a number of symbol time periods 606. According to various embodiments, the time length of each of the symbol time periods 606 may be equal to the period T of the periodically chirped source 102. Row 608 indicates, for each of the time periods 606, whether a logical zero or a logical one is encoded. For example, time periods 606 where a pulse 610 is present may be considered logical ones while time periods 606 where a pulse 610 is not present may be considered logical zeros. In some embodiments, this correlation may be reversed. In some embodiments, different ways of relating the presence or absence of a pulse 610 to a bit may be used. For example, a change in state from one period 606 to the next may indicate a logical one, while maintaining the same state from one period 606 to the next may indicate a logical zero (or visa versa). According to various embodiments, the data modulator 116 may utilize an amplitude shift keying (ASK) modulation format in addition to or instead of an OOK modulation format. According to an ASK modulation, the data modulator 116 may set and utilize multiple amplitude levels of the single-frequency source 104 and/or the periodically chirped source 102. Different amplitude levels of the respective sources 104, 102 may lead to different properties of the resulting impulses (e.g., amplitude), which may be used to encode data. Also, it will be appreciated that, instead of varying amplitude, an OOK or ASK modulation format may be implemented by varying a polarization of the output of the single-frequency source 104, the periodically chirped source 102 or both.

According to various embodiments, the data modulator 116 may encode a data stream onto the impulse signal 126 utilizing pulse position modulation (PPM). For example, referring to FIG. 5, each of the alternative single-frequency sources 510, 511 may have a different frequency or wavelength. That is, the frequencies of the respective sources 510, 511 may fall at different positions within the frequency band swept by the periodically chirped source 102. Accordingly, the different sources 510, 511 may each generate impulses at different time positions within the period T of the periodically chirped source 102, which may correspond to a symbol time period. By alternatively activating one source 510, or the other 511, the data modulator 116 may manipulate the position of impulses within the period T and/or symbol period. In this way, the data signal may be PPM modulated onto the impulse signal. In some embodiments, a similar effect may be achieved by modulating the frequency of a single, single-frequency source 104.

FIG. 7 illustrates a graph 700 showing a binary PPM modulated impulse signal 702 generated by one embodiment of the impulse generator 100. The time period shown is broken into symbol time periods 706, which may correspond to the period T of the periodically chirped source 102. Also, the value of the binary data stream at each symbol period 706 is indicated by row 708. Each symbol period 706 in the graph 700 may comprise an impulse 710 or 712. Symbol periods 706 having a logical one encoded therein may comprise an impulse 710 shifted to the right hand portion of the symbol period 706 (e.g., later in time during the symbol period 706). On the other hand, symbol periods 706 having a logical zero encoded therein may comprise a impulse 712 shifted to the left hand portion of the symbol period 706 (e.g., earlier in time during the symbol period 706). To generate impulse 710 or 712, the data modulator 116 may, for example, activate or turn on the alternative single-frequency source 510 or 511 respectively during the symbol period 706.

The PPM modulation illustrated by FIGS. 5 and 7 is referred to as binary PPM because there are two potential impulse positions within each symbol period, meaning that each symbol period may represent one of two potential symbols. It will be appreciated, however, that the impulse generator 100 of FIGS. 1 and 5 may be expanded to support arbitrary N-ary PPM, where N refers to the number of possible impulse positions within a symbol period (e.g. a number of bits per symbol may equal log 2[N]). For example, one or more additional alternative sources may be added to the single-frequency source 104. Also, in some embodiments, the single-frequency source 104 may be modulated to N different distinct frequencies. Collectively, the alternative sources making up the single-frequency source may have wavelengths and/or frequencies distributed across the spectrum swept by the periodically chirped source 102. As a result, each source, when activated, may bring about a different impulse position within the symbol time period 706. Accordingly, increasing the number of alternative sources used may serve to increase the number of possible symbol states, thereby increasing the amount of data that may be encoded in each symbol period (e.g., the number of bits per symbol).

Although OOK, ASK and PPM data modulation formats are described herein, it will be appreciated that any suitable data modulation format could be used. For example, in some embodiments, the data modulator 116 may encode a data stream onto the impulse signal 126 utilizing phase-shift keying or pulse-shape keying. According to one example of a phase-shift keyed or pulse-shape keyed modulation format, the data modulator 116 may cycle the optical phase of the single-frequency source 104 in a manner corresponding to the data stream. The phase or shape of impulses within the impulse signal 126 may also change accordingly. Embodiments utilizing phase-shift and/or pulse-shape keying may comprise a single-frequency source 104 that may be modulated between different phase outputs and/or the single-frequency source 104 may comprise multiple sources (e.g., 510, 511), each set to a distinct phase output. Similar to N-ary PPM, it will be appreciated that additional alternative sources having different wavelengths may be added to the single-frequency source 104 so as to increase the data rates of OOK, ASK, phase-shift keyed, or pulse-shape keyed data streams.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

In various embodiments disclosed herein, a single component may be replaced by multiple components and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

We claim:

1. A photonic impulse generator comprising:
    a periodically chirped photonic source configured to generate a wavelength swept output;
    a single-frequency photonic source configured to generate an output at a substantially constant optical frequency, wherein the frequency of the single-frequency photonic source falls within a frequency range of the periodically chirped photonic source;
    a data modulator in communication with at least one component selected from the group consisting of the single-frequency photonic source and the periodically chirped photonic source, wherein the data modulator is programmed to encode a data signal onto at least one output selected from the group consisting of the output of the periodically chirped photonic source and the output of the single-frequency photonic source;
    an optical coupler positioned to couple the output of the single-frequency photonic source to an output of the periodically chirped photonic source, resulting in a combined photonic signal;
    a photodetector positioned to receive the combined photonic signal and generate a combined electrical signal; and
    a filter in electrical communication with an output of the photodetector to receive the combined electrical signal to generate an encoded impulse signal, wherein the data signal is encoded on the encoded impulse signal.

2. The photonic impulse generator of claim 1, wherein the periodically chirped photonic source comprises:
    a mode-locked laser; and
    a chromatic dispersive element in photonic communication with the mode-locked laser.

3. The photonic impulse generator of claim 2, wherein the chromatic dispersive element comprises a chirped fiber Bragg grating.

4. The photonic impulse generator of claim 1, wherein the periodically chirped photonic source comprises a theta-cavity laser.

5. The photonic impulse generator of claim 1, wherein the periodically chirped photonic source and the single-frequency photonic source are coherent sources.

6. The photonic impulse generator of claim 1, wherein the data modulator is in communication with the periodically chirped photonic source and is programmed to encode the digital signal onto the encoded impulse signal by modulating at least one property of the output of the periodically chirped photonic source selected from the group consisting of an amplitude, a phase, and a polarization.

7. The photonic impulse generator of claim 1, wherein the data modulator is in communication with the single-frequency photonic source and is programmed to encode the digital signal onto the encoded impulse signal by modulating at least one property of the output of the single-frequency source selected from the group consisting of an amplitude, a phase, a frequency and a polarization.

8. The photonic impulse generator of claim 1, wherein the data modulator is in communication with the single-frequency photonic source and is programmed to encode the digital signal onto the encoded impulse signal according to pulse position modulation (PPM) by modulating the frequency of the single-frequency photonic source.

9. The photonic impulse generator of claim 1, wherein the data modulator is programmed to encode the digital signal onto the encoded impulse signal according to at least one modulation format selected from the group consisting of a phase-shift keyed modulation format and a pulse-shape keyed modulation format by modulating a phase of at least one of the single-frequency photonic source and the periodically chirped source.

10. The photonic impulse generator of claim 1, wherein the data modulator is programmed to encode the digital signal onto the encoded impulse signal according to at least one modulation format selected from the group consisting of an on/off keyed (OOK) modulation format and an amplitude shift keyed (ASK) modulation format.

11. The photonic impulse generator of claim 10, wherein the data modulator is programmed to encode the digital signal onto the encoded impulse signal according to an OOK modulation by alternatively activating and deactivating at least one of the single-frequency photonic source and the periodically chirped photonic source.

12. The photonic impulse generator of claim 10, wherein the data modulator is programmed to encode the digital signal onto the encoded impulse signal by modulating a polarization of at least one of the single-frequency photonic source and the periodically chirped photonic source.

13. The photonic impulse generator of claim 1, further comprising:
    a second single-frequency photonic source, wherein a frequency of the second single-frequency photonic source is different than a frequency of the single-frequency photonic source, wherein the frequency of the second single-frequency photonic source falls within the frequency range of the periodically chirped source;
    a second optical coupler, wherein the second optical coupler is positioned to couple at least the output of the single-frequency photonic source with an output of the second single-frequency photonic source, wherein the data modulator is programmed to encode a digital signal onto the encoded impulse signal by modifying outputs of the single-frequency source and the second single-frequency source.

14. The photonic impulse generator of claim 13, wherein the data modulator is programmed to encode a digital signal onto the encoded impulse signal according to pulse position modulation (PPM) by alternatively activating and deactivating the single-frequency photonic source and the second single-frequency photonic source.

15. The photonic impulse generator of claim 1, wherein the single-frequency photonic source comprises a distributed feedback (DFB) laser.

16. The photonic impulse generator of claim 1, further comprising a polarization controller in optical communication with the output of the single-frequency photonic source.

17. The photonic impulse generator of claim 1, further comprising a first portion of optical fiber optically positioned between the periodically chirped photonic source and the optical coupler and a second portion of optical fiber optically positioned between the single-frequency photonic source and the optical coupler.

18. The photonic impulse generator of claim 17, further comprising a third portion of optical fiber optically positioned between the optical coupler and the photodetector.

19. The photonic impulse generator of claim 17, wherein the first and second portions of optical fiber are polarization maintaining.

20. The photonic impulse generator of claim 1, wherein the filter is implemented utilizing at least one component selected from the group consisting of a microprocessor, a resistor, an inductor and a capacitor.

21. The photonic impulse generator of claim 1, wherein the filter has a frequency passband corresponding to an ultra-wideband (UWB) spectrum.

22. The photonic impulse generator of claim 21, wherein the frequency passband of the filter is substantially between about 3.1 GHz and about 10.6 GHz.

23. The photonic impulse generator of claim 1, further comprising a radio-frequency transmitter in communication with an output of the filter.

* * * * *